Jan. 12, 1943.                J. T. RETTALIATA                2,308,426
                                TURBINE BLADING
                              Filed June 17, 1940

Inventor
J. T. Rettaliata
by
Attorney

Patented Jan. 12, 1943

2,308,426

UNITED STATES PATENT OFFICE 2,308,426

TURBINE BLADING

John T. Rettaliata, Wauwatosa, Wis., assignor to Allis-Chalmers Manufacturing Company, Milwaukee, Wis., a corporation of Delaware Application June 17, 1940, Serial No. 340,979

2 Claims. (Cl. 253—77)

This invention relates to blading construction for steam and gas turbines.

In order to obtain greater strength and rigidity in the blading of high temperature, high pressure turbines, it has heretofore been known to unite adjacent blades at their root and shroud portions, as by welding. It has been found, however, that welding the blades of a row at their shroud portions does not work out satisfactorily in practice, because the shrouding or blading has cracked or broken in service, when a number of blades in a row have been welded together.

It is an object of this invention to provide a turbine blade construction of great strength and which will not break in service.

It is another object of this invention to unite turbine blades at their shroud portions in groups of two or three only, thereby eliminating stresses which necessarily result when larger groups of blades are connected together.

A still further object of this invention is to provide a method of eliminating destructive vibration of impulse blading in a high speed expansible fluid turbine which comprises the step of welding adjacent blades of a row to each other at their end portions in circumferential groups of two or three blades; which may otherwise be defined as circumferential groups spanning a maximum included angle of approximately 7°.

Other and auxiliary objects of this invention will become apparent from the following description, taken in connection with the drawing appended hereto.

Figure 1:
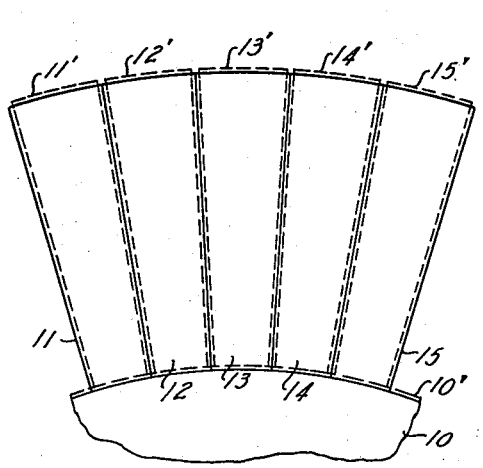
Fig. 1 illustrates in full lines a section of a row of blades, the dotted lines indicating in exaggerated fashion the change in dimensions of disk and blades which occurs during rotation of the spindle.

A more complete understanding of the operation and advantages of this invention may be had from the following analysis:

Referring to Fig. 1, assume that spindle or disk 10 of an expansible fluid turbine has mounted in a suitable groove thereof a plurality of individual turbine blades 11, 12, 13, 14 and 15 which abut each other, as shown, when the turbine spindle is at rest. The position of the blades and disk when at rest is shown in full lines in Fig. 1. For purposes of illustration, the blades are shown as having radial, abutting sides, the illustration being diagrammatic only.

When the turbine spindle is set in rotation, however, stresses due to centrifugal force are set up which result in deformation of both the spindle and the blades. The spindle will expand radially, assuming a new circumference 10'. The blades likewise will be deformed by the centrifugal force to which they are subjected, becoming longer and thinner, as shown in exaggerated fashion in dotted lines in Fig. 1. This will cause a space to occur between adjacent blades which previously abutted each other, as the dotted lines clearly illustrate with reference to blades 11', 12', 13', 14' and 15'.

To obtain a quantitative evaluation of this spacing between adjacent blades, consider the following assumed conditions. Let spindle 10 be 31" in diameter, with the blades extending 2" beyond the periphery of spindle 10. If the spindle is rotated at 3600 R. P. M., the average radial and tangential stresses in the disk will each be about 15,000 pounds per square inch. The unit radial elongation in the disk caused by this stress is expressed by the following formula:

$$e_d = \frac{1}{E}(S_r - vS_t)$$

in which $e_d$ = unit radial elongation of the disk;
$S_r$ = average radial stress in the disk;
$S_t$ = average tangential stress in the disk;
$E$ = modulus of elasticity of disk material; and
$v$ = Poisson's ratio (ratio of longitudinal expansion to sectional contraction of the disk).

Substituting appropriate values for the symbols in this formula, $$e_d = \frac{1}{30 \times 10^6}(15{,}000 - 0.3 \times 15{,}000)$$

= .00035 in. per inch of radius of the disk

The total radial elongation of the disk $e_D$ will be the unit elongation, $e_d$, multiplied by the radius of the disk.

$$e_D = e_d \times r = .00035 \times 15.5 = .00543 \text{ in.}$$

Since the blades also are subjected to centrifugal force, they also will become elongated. This elongation of the blades can be determined from the formula $$e_b = \frac{h \times S_c}{E}$$

in which $e_b$ = total radial elongation of the blade;
$h$ = blade length above periphery of disk;
$S_c$ = average stress in blade due to centrifugal force at the assumed speed; and
$E$ = modulus of elasticity of blade material

Case I

Assuming that the length of the blades is 2 inches, and that the centrifugal stress in the blades at a rotational speed of 3600 R. P. M. is equal to 3,000 pounds per square inch, the total radial elongation of each blade will be $$e_b = \frac{2 \times 3{,}000}{30 \times 10^6} = .0002 \text{ in.}$$

The total increase in radius of disks and blades combined will be $e_D + e_b = .00543 + .0002 = .00563$ in.

The resultant spacing introduced between individual blade tips due to this increase in radius will be $$x = \frac{2\pi(e_b + e_d)}{n}$$

where $n$ is the number of blades in a single circumferential row, which is assumed to be 110 in this case. Substituting the correct values, $$x = \frac{2\pi \times .00563}{110} = .0003213 \text{ in.}$$

Case II

The spacing between blades is affected not only by centrifugal force and the resultant enlargement of disk diameter and elongation of the blades, but only by the relative temperature to which the disk and blades are subjected. For example, if the average temperature of the blades is 300° lower than the average temperature of the disk—a condition which may occur upon a sudden drop of load on the turbine—the blades will contract radially and circumferentially, the circumferential contraction of the blades resulting in an increase of the spacing between adjacent blades.

Assuming a relative drop of 300° in the temperature of the blades as compared to the temperature of the disk, the resultant increase in spacing between adjacent blades will be:

$$x = \frac{2\pi R \times T \times K}{n}$$

where $x$ = increase in spacing at the ends of adjacent blades;
$R$ = effective radius of disk plus blades;
$T$ = difference in average temperatures between disk and blades;
$K$ = temperature coefficient of expansion of the blade material; and
$n$ = number of blades in the complete row.

In the assumed case, $R = 17.5$, $T = 300$, $K$ may be assumed to be $8 \times 10^6$, and $n = 110$. Substituting these values, $$x = \frac{2\pi \times 17.5 \times 300 \times 8 \times 10^{-6}}{110} = .0024 \text{ in.}$$

To obtain the total spacing between tips of adjacent blades under these circumstances, the latter figure should be added to the spacing between blades during normal (uniform temperature) rotation, as previously obtained.

$$x_{\text{total}} = .0024 + .00032 = .00272 \text{ in.}$$

Case III

If the blade temperature is 300° higher than the temperature of the disk, then blades will tend to expand circumferentially, each blade tip tending to expand by an amount equal to .0024″. Since the normal spacing between blades during normal rotation is .00032, the resultant spacing would be .00032 − .0024, or −.00208. That is, instead of being spaced from each other, the blade tips would tend to overlap each other.

The above analysis is made on the assumption that the blades are not connected to adjacent blades at their tips or shrouds. If the blades are welded together at their shrouds, separation of the blades is prevented, and great stresses are set up in the blades and shrouds due to the above described tendency of the blades to separate.

Figure 3:
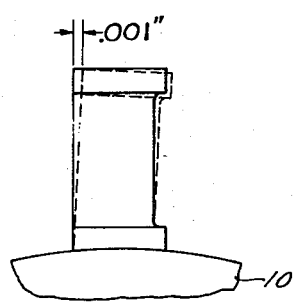
Fig. 3 is a diagrammatic showing of a turbine blade.

An analysis of these stresses follows: Referring to Fig. 3, assume a blade 2 inches long, deflected from its normal position by .001 in. at its tip, by some force W applied at the tip of the blade.

Assuming a uniform blade section, this deflection may be expressed by the formula $$D = \frac{Wl^3}{3EI}$$

wherein $D$ = deflection in inches (.001 in. assumed);
$W$ = deflecting force (unknown);
$l$ = length or height of blade (2 in.);
$E$ = modulus of elasticity of blade material ($3 \times 10^7$); and
$I$ = moment of inertia (.02152).

From the above formula, $$W = \frac{3DEI}{l^3}$$

$$= \frac{3 \times .001 \times 3 \times 10^7 \times .02152}{(2)^3} = 242 \text{ lbs.}$$

Therefore, it requires a force of 242 pounds applied at the free end or shroud of the blade to cause a deflection of .001 inch at that point.

The bending moment about the root of the blade due to this force is equal to the product of the force and the moment arm on which it acts.

$$242 \times 2 = 484 \text{ lb. in.}$$

The stress at the inlet edge due to this moment is the moment divided by the section modulus of the blade which in the instant case may be assumed to be, .03343 cu. in.

$$S = \frac{484}{.03343} = 14{,}440 \text{ lbs./sq. in.}$$

From the above, it follows that blades are subjected to a stress of 14,400 lbs./sq. in. upon a deflection of the shroud by .001 in. When a group of blades are welded together at their shrouds, the spacing between blades which tends to occur when the turbine spindle is rotating at normal speed (see Fig. 1) is prevented. In effect, the blades are deflected from their normal position, shown in dotted lines in Fig. 2, to the deflected position shown in exaggerated fashion in full lines in Fig. 2.

It may be noted that, with the shroud ends of the blades free, the space between adjacent blades during rotation would be .00032″, as indicated in the description referring to Case I, above. This means that, if a group of five blades are welded together, as shown in full lines in Fig. 2, the two outer blades have to be deflected approximately twice the interblade spacing, or .00064, thereby introducing a stress of 0.64 × 14,440, or approximately 9,250 lbs./sq. in. due to this factor alone. This stress may be increased or decreased upon a relative change in temperatures between the disk and its blades, as indicated under the analyses of Cases II and III, above.

Figure 2:
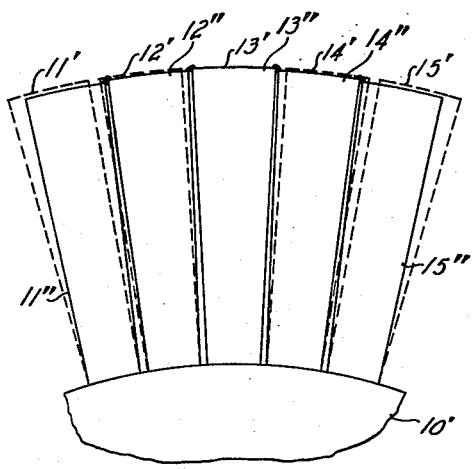
Fig. 2 illustrates the deforming effect of welding a group of blade shrouds.

In addition to the stresses in the blades due to the above described deflection, it will be noted from an examination of the blades shown in full lines in Fig. 2 that a serious shearing stress at the welds between adjacent blades is also introduced, especially between the outer blades of a welded group and the adjacent blades. This is due to the increase in the length required of these blades to maintain contact with the tip of an adjacent blade which is bent away from the outer blade. See, for example, blades 14" and 15" in Fig. 2.

Figure 4:
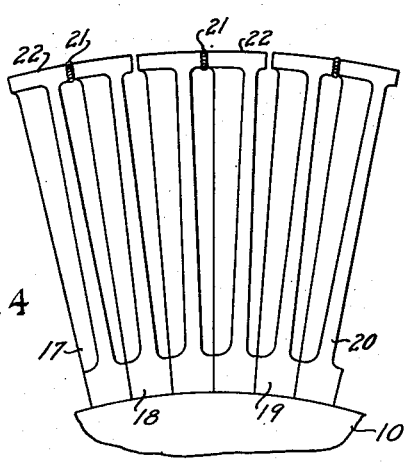
Fig. 4 is a fragmental showing of a turbine disk provided with blading in accordance with this invention.

In accordance with this invention, these undesirable stresses are greatly reduced by limiting the number of blades which are welded together to small groups—preferably groups of two or three blades only. When two blades only are welded together at their shroud portions, the stability of the blades is greatly improved over individual, unconnected blades; while at the same time, the stresses introduced by deflection of the blades from their normal position during rotation are quite limited in magnitude. Moreover, the shear stress between welded blades is entirely eliminated. In practice, this limiting of welded groups to two blades to each group has eliminated previously occurring blade failures on high speed, high pressure impulse blading. Such a blading arrangement is shown in Fig. 4, wherein the blades 17, 18, 19, 20 are provided with integral shrouds 22 which are welded together at 21 in groups of two blades each. In this arrangement, the stress in each blade due to rotational forces is minimized sufficiently to eliminate failure of blading, and shearing stresses on welds 21 are entirely eliminated.

Some of the advantages of this invention are also obtained when blades are welded in groups of three blades each. In general, blade material is not stressed beyond a safe point if the blades in each group are limited to a maximum included angle of not more than 7° as measured between corresponding points of the outer blades of a group.

While constructions in accordance with the invention have been found to be of particular importance in impulse blading, the invention is not limited thereto, but is applicable to turbine blading generally.

It is claimed and desired to secure by Letters Patent:

1. In a high speed turbine spindle provided with a circumferential row of blades connected at their shroud portions, the method of reducing shear and tension stresses in said shroud connections and tension stresses in said blades due to the fanning action of the blades at high spindle speeds, which comprises integrally connecting said blades at the shroud portions thereof in circumferential groups having a maximum included angle of seven degrees, thereby limiting the blade deflection resulting from said fanning action to a safe value and substantially reducing the tensile and shear stresses at said shroud connections.

2. In combination, a turbine spindle, a circumferential row of blades rigidly mounted on said spindle, and means connecting the outer ends of said blades in groups operative to limit the deflection of interconnected blades produced by their fanning action at high rotative spindle speeds to a safe value and to thereby substantially reduce shear and tension stresses in said connections and tension stresses in said blades comprising shroud structures integrally connecting said blade ends in circumferential groups having a maximum included angle of seven degrees.

JOHN T. RETTALIATA.